United States Patent
Kondo et al.

(10) Patent No.: US 11,186,720 B2
(45) Date of Patent: *Nov. 30, 2021

(54) QUINOPHTHALONE COMPOUND

(71) Applicant: DIC Corporation, Tokyo (JP)

(72) Inventors: Hitoshi Kondo, Sakura (JP); Tatsuya Shigehiro, Sakura (JP); Kengo Yasui, Sakura (JP)

(73) Assignee: DIC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/252,381

(22) PCT Filed: Jun. 13, 2019

(86) PCT No.: PCT/JP2019/023445
§ 371 (c)(1),
(2) Date: Dec. 15, 2020

(87) PCT Pub. No.: WO2020/012865
PCT Pub. Date: Jan. 16, 2020

(65) Prior Publication Data
US 2021/0261783 A1    Aug. 26, 2021

(30) Foreign Application Priority Data
Jul. 13, 2018   (JP) .............................. JP2018-133213

(51) Int. Cl.
*C09B 25/00*   (2006.01)
*G02B 5/20*    (2006.01)

(52) U.S. Cl.
CPC .............. *C09B 25/00* (2013.01); *G02B 5/20* (2013.01)

(58) Field of Classification Search
CPC ...................................................... C09B 25/00
See application file for complete search history.

(56) References Cited

U.S. PATENT DOCUMENTS

| | | | |
|---|---|---|---|
| 4,150,025 A * | 4/1979 | Shimada | C07D 215/18 106/498 |
| 5,106,980 A * | 4/1992 | Ort | C09B 25/00 546/167 |
| 9,062,206 B2 * | 6/2015 | Gharda | C09B 25/00 |
| 2014/0288311 A1 | 9/2014 | Gharda | |
| 2016/0039237 A1* | 2/2016 | Yoshida | B41M 5/385 347/217 |
| 2020/0239693 A1* | 7/2020 | Shigehiro | C09B 25/00 |

FOREIGN PATENT DOCUMENTS

| | | |
|---|---|---|
| JP | 48-32765 B1 | 10/1973 |
| JP | 53-228 A | 1/1978 |
| JP | 2011-242425 A | 12/2011 |
| JP | 2013-61622 A | 4/2013 |
| JP | 2013-205581 A | 10/2013 |
| WO | 2013/098836 A1 | 7/2013 |
| WO | 2018/159372 A1 | 9/2018 |

OTHER PUBLICATIONS

International Search Report dated Jul. 16, 2019, issued in counterpart International Application No. PCT/JP2019/023445 (2 pages).

* cited by examiner

*Primary Examiner* — Amanda L. Aguirre
(74) *Attorney, Agent, or Firm* — Westerman, Hattori, Daniels & Adrian, LLP

(57) ABSTRACT

A new yellow pigment excellent in both brightness and coloring power is provided. It has been found that dimerization of a specific quinophthalone skeleton gives more selective absorption and transmittance. Furthermore, the dimerization method was also studied, and it has been found that excessive reddish tone can be suppressed by cleaving the conjugate using a methylene chain as a spacer instead of simply employing a direct bond. In addition, dispersibility has been improved by polyhalogenation and introduction of an imide structure. Furthermore, a coloring agent containing the quinophthalone compound and a coloring composition containing the coloring agent are provided.

3 Claims, No Drawings

QUINOPHTHALONE COMPOUND

TECHNICAL FIELD

The present invention relates to a new quinophthalone compound.

BACKGROUND ART

PTLs 1 and 2 disclose bis-quinophthalone compounds having a certain structure. In addition, PTL 3 discloses a quinophthalone compound having a certain structure. However, PTLs 1, 2, and 3 do not disclose a compound of the present invention represented by the following formula (1).

CITATION LIST

Patent Literature

PTL 1: Japanese Examined Patent Application Publication No. 48-32765
PTL 2: International Publication No. WO/2013/098836
PTL 3: Japanese Unexamined Patent Application Publication No. 53-228

SUMMARY OF INVENTION

Technical Problem

Currently, coloring compositions are being used in various fields, specifically, for example, in printing ink, paint, coloring agents for resins, coloring agents for fibers, and coloring materials for recording information (coloring materials to be used in color filters, toner, ink jet printing, etc.). The coloring matter used in a coloring composition is roughly classified into a pigment and a dye, and as the performance required for them, for example, color characteristics (coloring power and clarity) and resistances (weather resistance, light resistance, heat resistance, and solvent resistance) are mentioned. Generally, unlike dyes, which develop color in molecular states, pigments develop color in particle states (aggregates of primary particles). Accordingly, pigments are usually superior to dyes in resistance, but many pigments are inferior to dyes in coloring power and clarity. In such circumstances, a pigment having high coloring power and high saturation is demanded. In particular, special attention is being paid to organic pigments which are recognized to be excellent in coloring power.

In such organic pigments, for example, the number of yellow pigments registered in Color Index is large next to that of red pigments, and many new pigments have been actively developed so far. As yellow organic pigments actually used, for example, C.I. Pigment Yellows 3, 12, and 74 are used in printing ink, C.I. Pigment Yellows 74, 83, 109, and 110 are used in paint, and C.I. Pigment Yellows 129, 138, 150, and 185 are used in color filters. However, the basic structures of these pigments are mainly azo, azomethine, isoindoline, isoindolinone, and so on. Accordingly, structural variation of yellow organic pigments is still insufficient for corresponding to required various uses.

In particular, color filters for liquid crystal displays or pigments used in these color filters are required to have characteristics different from those in known general use. Specifically, there are requirements for, for example, "high brightness" that can decrease the power consumption of a backlight and further "high coloring power" that enables a reduction in the thickness and high color reproduction of a color filter. However, at present, there is no pigment that meets all of these requirements in the current yellow pigments for color filters.

Here, a color filter consists of a red pixel part (R), a green pixel part (G), and a blue pixel part (B), and a yellow pigment is used for toning the green pixel part in many cases. Among yellow pigments, C.I. Pigment Yellow 138 is most used but is poor in coloring power and is not practical for color standard that requires high color reproducibility. Accordingly, in high color reproducibility color standard, C.I. Pigment Yellow 150 is used as a current yellow pigment but is also not sufficient in both brightness and coloring power. Accordingly, the creation of a new yellow pigment excellent in both brightness and coloring power is being desired.

Solution to Problem

The present inventors have diligently studied to solve the above problems and, as a result, have found that dimerization of a quinophthalone skeleton gives more selective absorption and transmittance. Furthermore, the dimerization method was also studied, and it has been found that excessive reddish tone can be suppressed by cleaving the conjugate using a methylene chain as a spacer instead of simply employing a direct bond. In addition, dispersibility has been improved by polyhalogenation and introduction of an imide structure.

The present inventors have found based on these study results that a compound represented by the following formula (1) can solve the above-mentioned problems and have accomplished the present invention. That is, the present invention relates to a quinophthalone compound (hereinafter, may be referred to as "the present inventive compound") represented by the following formula (1):

[Chem. 1]

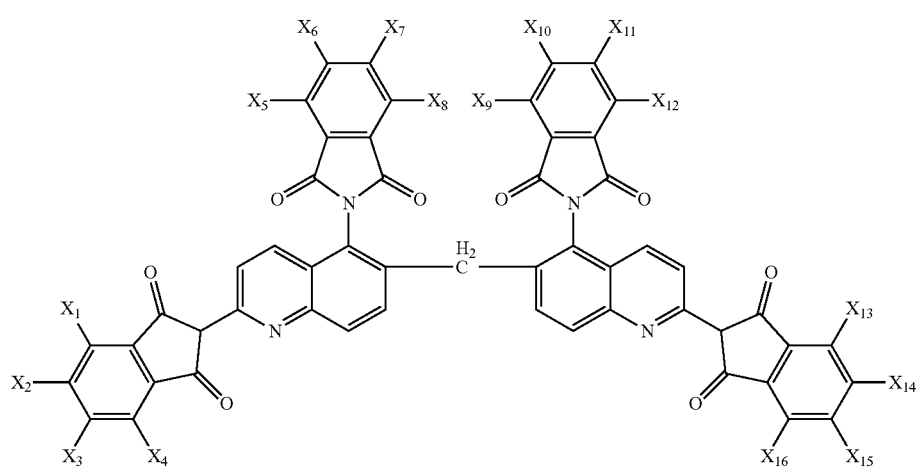

(1)

(in formula (1), $X_1$ to $X_{16}$ are each independently a hydrogen atom or a halogen atom).

Advantageous Effects of Invention

The present inventive compound has excellent brightness and coloring power. In particular, in color standard for high color reproduction in color filter use, the present inventive compound has better brightness than a current yellow pigment (C.I. Pigment Yellow 150) and has excellent coloring power higher than that of the current yellow pigment.

DESCRIPTION OF EMBODIMENTS

As the halogen atom in the formula (1), fluorine, chlorine, bromine, and iodine atoms are mentioned, and a fluorine atom, a chlorine atom, or a bromine atom is preferable, and a chlorine atom is more preferable.

Incidentally, the quinophthalone compound represented by the formula (1) exists as tautomers having structures of, for example, the following general formulae (1-i) and (1-ii), and these tautomers are also encompassed in the present invention.

[Chem. 2]

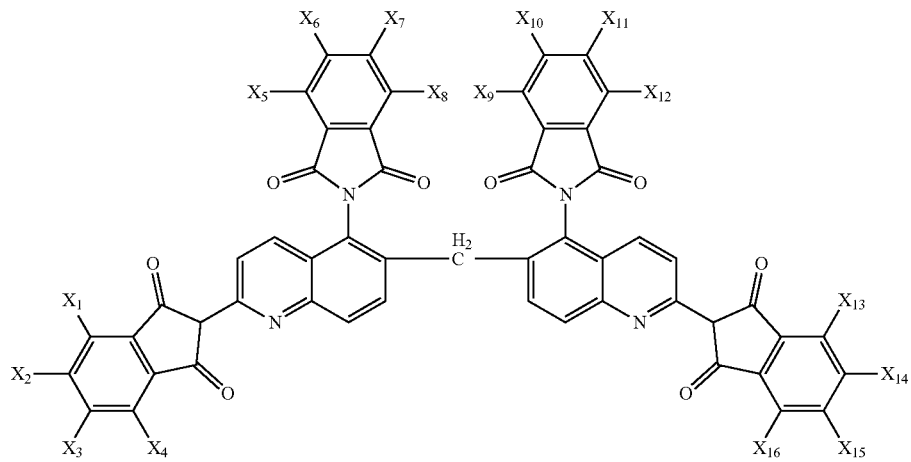

(1)

 

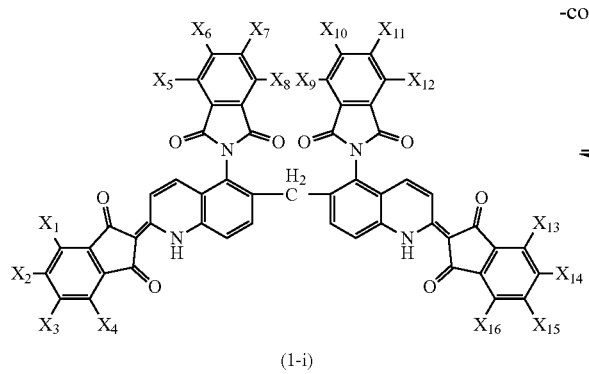
(1-i)
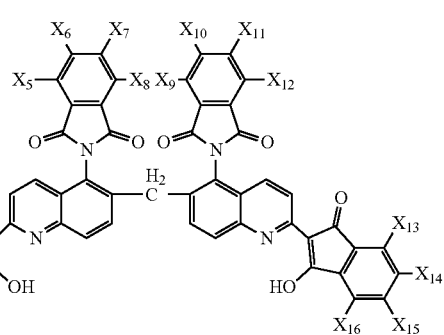
(1-ii)
In formulae (1-i) and (1-ii), $X_1$ to $X_{16}$ are as described above.
Examples of the quinophthalone compound of the present invention are specifically shown below, but the present invention is not limited thereto.
[Chem. 3]
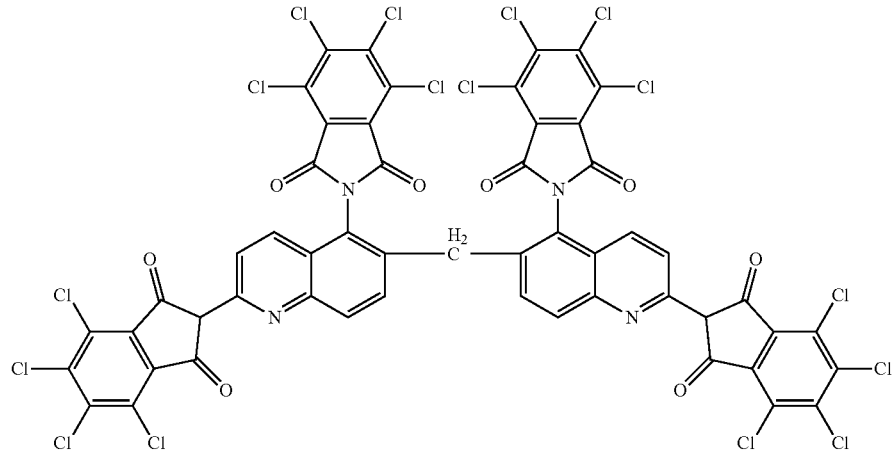
(1-1)
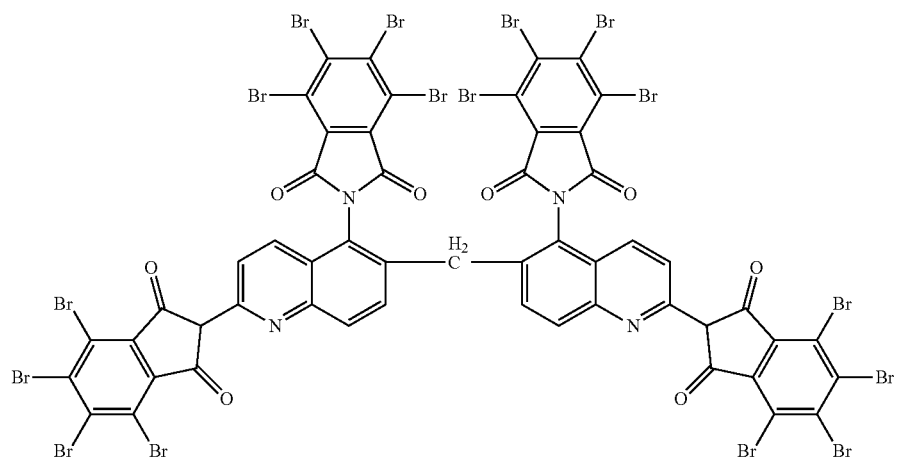
(1-2)

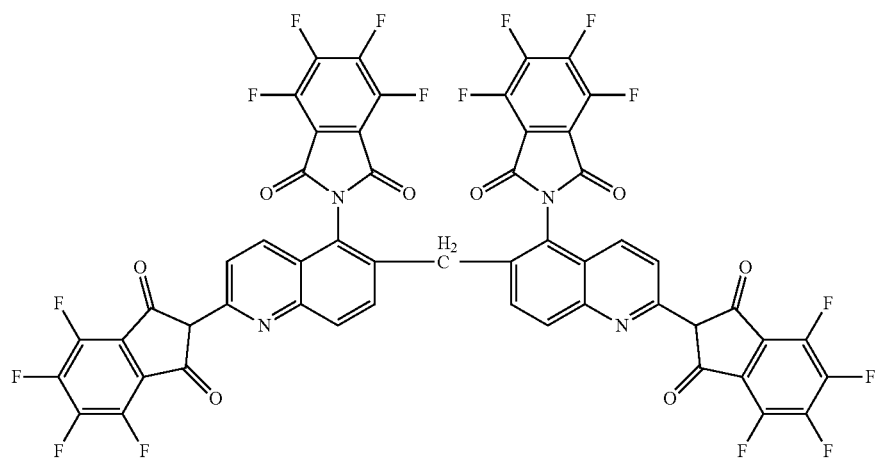
(1-3)
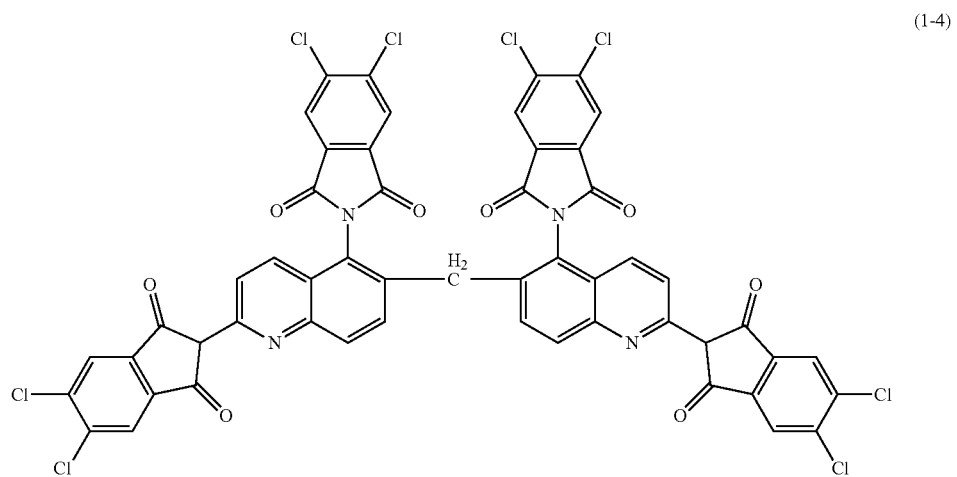
(1-4)
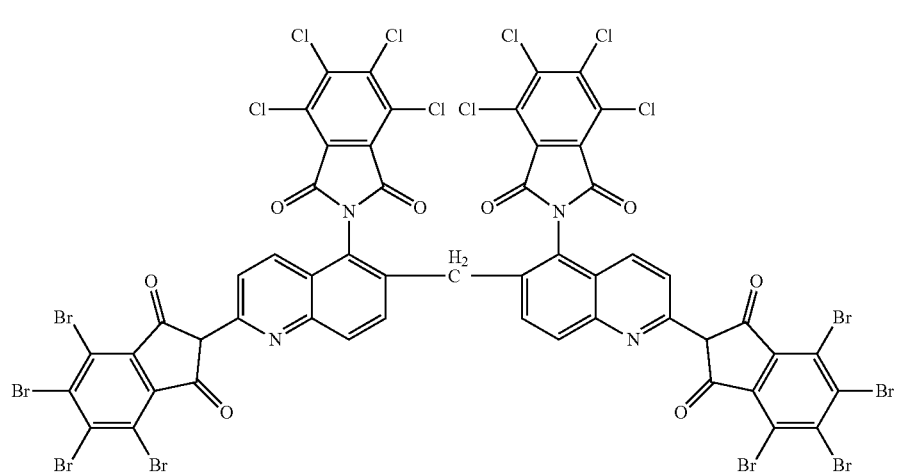
(1-5)

-continued

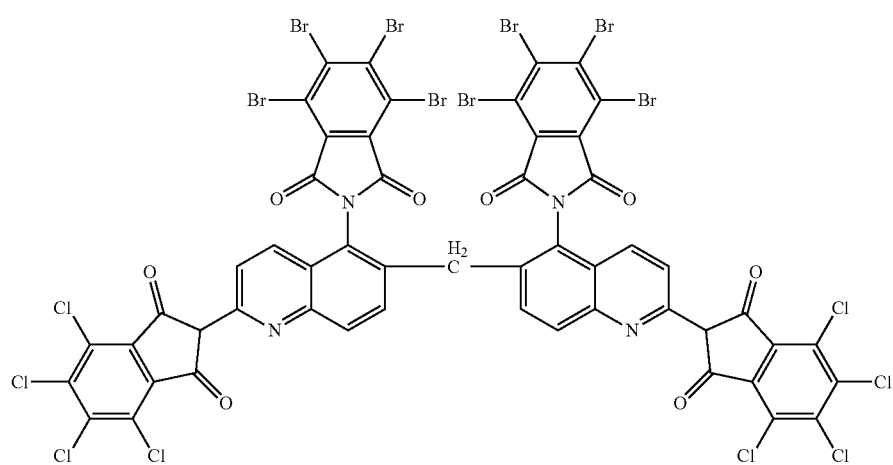
(1-6)

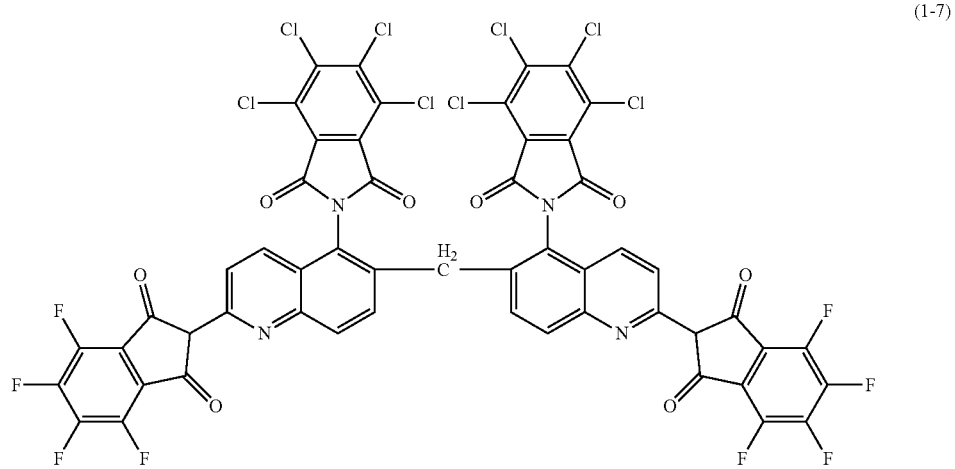
(1-7)

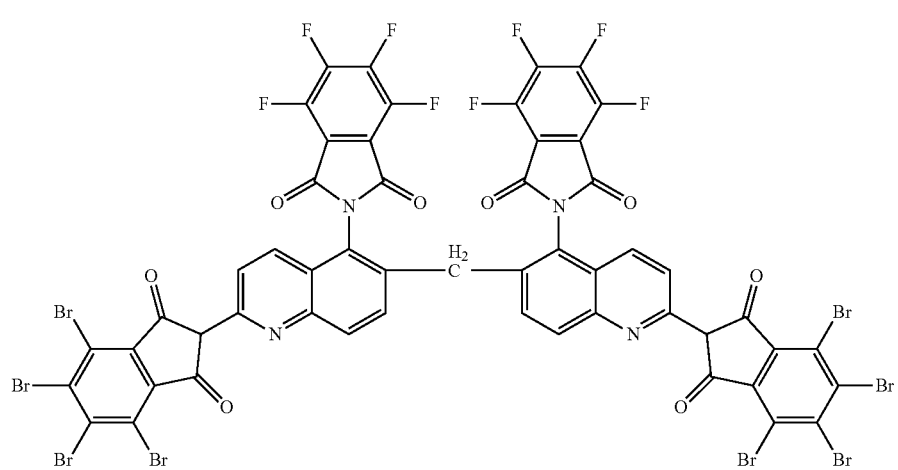
(1-8)

The method for manufacturing such a present inventive compound is not particularly limited, and a known method can be appropriately used for the manufacturing. An aspect of the method for manufacturing the present inventive compound will now be described. However, the present invention is not limited thereto.

The present inventive compound can be obtained by, for example, a method including the following step I, step II, step III, and step IV.

<Step I>

First, 2 to 3 equivalents of croton aldehyde is added to and reacted with 1 equivalent of 4,4'-diaminodiphenylmethane in the presence of an oxidizing agent in a strong acid by, for example, the method described in J. Heterocyclic Chem., 30, 17, (1993) to synthesize 6,6'-methylene bis(2-methylquinoline): formula (2).

[Chem. 4]

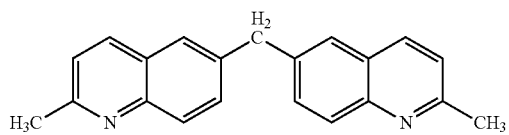

(2)

Here, examples of the strong acid include hydrochloric acid, sulfuric acid, and nitric acid.

Examples of the oxidizing agent include sodium iodide, p-chloranil, and nitrobenzene.

Step I can be performed at a reaction temperature of 80° C. to 100° C., preferably 90° C. to 100° C., for a reaction time of 1 to 6 hours, preferably 3 to 6 hours.

<Step II>

Furthermore, the resulting compound of formula (2) is reacted with nitric acid or fuming nitric acid in the presence of concentrated sulfuric acid to obtain a compound of formula (3).

[Chem. 5]

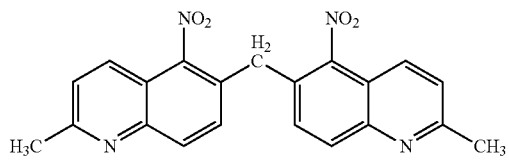

(3)

Step II can be performed at a reaction temperature of −20° C. to +40° C., preferably 0° C. to +20° C., for a reaction time of 1 to 4 hours, preferably 1 to 3 hours.

<Step III>

Furthermore, 6 to 8 equivalents of reduced iron is added to and reacted with 1 equivalent of the resulting compound of formula (3) to obtain a compound of formula (4).

[Chem. 6]

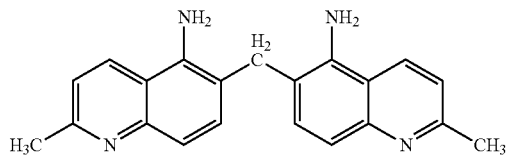

(4)

Step III can be performed at a reaction temperature of 60° C. to 80° C., preferably 70° C. to 80° C., for a reaction time of 1 to 3 hours, preferably 2 to 3 hours.

<Step IV>

Furthermore, 4 to 6 equivalents of phthalic anhydride or tetrahalophthalic anhydride is reacted with 1 equivalent of the resulting compound of formula (4) in the presence of an acid catalyst by, for example, the method described in Japanese Unexamined Patent Application Publication No. 2013-61622 to obtain a compound of formula (1).

Here, examples of the acid catalyst include benzoic acid and zinc chloride.

Step IV can be performed at a reaction temperature of 180° C. to 250° C., preferably 200° C. to 250° C., for a reaction time of 1 to 8 hours, preferably 3 to 8 hours.

The present inventive compound may be used alone, or two or more compounds may be appropriately selected and used in combination.

It is inferred that the present inventive compound can be applied to various uses. For example, it can be used as a coloring agent in various uses, such as printing ink, paint, colored plastic, toner, ink jet ink, a light-shielding member for a display, and seed coloring.

The present inventive compound shows properties as an organic pigment and can be more suitably used through, for example, salt milling treatment for refinement of pigment particles in some cases. Such treatment may be performed by a known common method.

The present inventive compound may be used in combination with a coloring material, such as an organic pigment, an organic dye, or an organic pigment derivative, other than the present inventive compound for toning. Such a combination should be appropriately selected according to the above-described use, and the present inventive compound may be used alone, or two or more compounds may be appropriately used in combination, depending on the use.

The coloring material that can be used in combination may be any of, for example, known pigments and dyes.

Depending on the use, for example, azo-based, disazo-based, azomethine-based, anthraquinone-based, quinophthalone-based, quinacridone-based, diketo-pyrrolo-pyrrole-based, dioxazine-based, benzimidazolone-based, phthalocyanine-based, isoindoline-based, isoindolinone-based, and perylene-based pigments and xanthene-based, azo-based, disazo-based, anthraquinone-based, quinophthalone-based, triarylmethane-based, methine-based, phthalocyanine-based, and rhodamine-based dyes are mentioned.

As the yellow pigment that can be used in combination with the present inventive compound, for example, C.I. Pigment Yellows 3, 12, and 74 are used in printing ink, C.I. Pigment Yellows 74, 83, 109, and 110 are used in paint, and C.I. Pigment Yellows 83, 129, 138, 139, 150, 185, and 231 are used in color filters.

In particular, when the present inventive compound is used for forming a green pixel part to be used in a color filter, the present inventive compound can be used in combination with, for example, but not limited to, a green pigment, such as C.I. Pigment Greens 1, 2, 4, 7, 8, 10, 13, 14, 15, 17, 18, 19, 26, 36, 45, 48, 50, 51, 54, 55, 58, 59, 62, and 63. When the present inventive compound is used for forming a green pixel part to be used in a color filter, the combination rate between a green pigment and a yellow pigment of the present invention is, for example, 10 to 100 parts by mass of the yellow pigment for 100 parts by mass of the green pigment.

In addition, when the present inventive compound is used for forming a green pixel part, the present inventive compound and a blue pigment can also be used in combination. Examples of the blue pigment include C.I. Pigment Blues 15, 15:1, 15:2, 15:3, 15:4, and 15:6, and aluminum phthalocyanine derivatives.

Here, the aluminum phthalocyanine derivatives are, for example, compounds represented by the following general formula (5-1):

[Chem. 7]

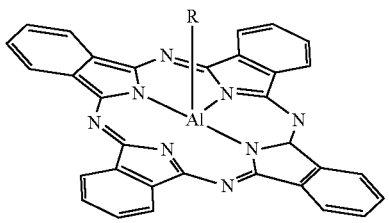

(5-1)

(in formula (5-1), R is a halogen atom, a hydroxy group, or a group represented by the following general formula (5-2)),

[Chem. 8]

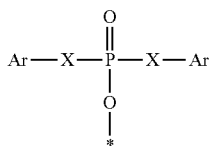

(5-2)

(in formula (5-2), X is a direct bond or an oxygen atom; Ar is a phenyl group or a naphthyl group; and the asterisk in the formula represents a bonding site).

Examples of the halogen atom as R in the formula (5-1) include a fluorine atom, a chlorine atom, a bromine atom, and an iodine atom. In particular, the halogen atom as R is preferably a chlorine atom or a bromine atom.

In formula (5-1), R is preferably a chlorine atom, a bromine atom, a hydroxy group, or a group represented by the general formula (5-2).

In formula (5-2), X is preferably an oxygen atom.

Preferred examples among those of formula (5-1) include hydroxyaluminum phthalocyanine, chloroaluminum phthalocyanine, bromoaluminum phthalocyanine, the compound represented by the following formula (5-1-1), the compound represented by the following formula (5-1-2), and the compound represented by the following formula (5-1-3).

[Chem. 9]

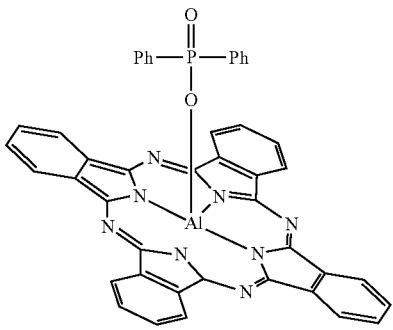

(5-1-1)

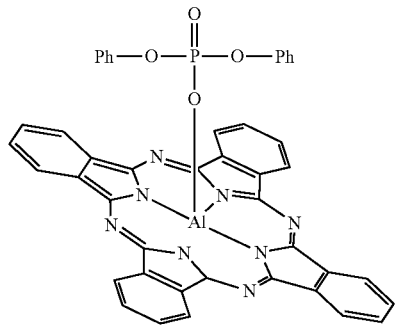

(5-1-2)

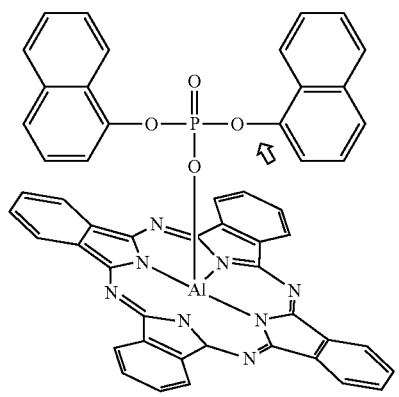

(5-1-3)

Furthermore, the present inventive compound can be used in combination with a red pigment for forming a red pixel part to be used in a color filter. Examples of the red pigment include C.I. Pigment Reds 177 and 254.

When the present invention is used in formation of a pattern of a green pixel part of a color filter, a known method can be employed. Typically, a photosensitive composition for a color filter containing a compound of the present invention and a photosensitive resin as essential components can be obtained.

As a method for manufacturing a color filter, for example, mentioned is a method called photolithography in which the present inventive compound is dispersed in a dispersion medium consisting of a photosensitive resin, then applying the dispersion on a transparent substrate, such as glass, by a spin coating method, a roll coating method, an ink jet method, or the like, subsequently subjecting this coated layer to pattern exposure to ultraviolet rays through a photomask, and then washing the unexposed portion with a solvent or the like to obtain a green pattern. The same applies also when the present invention is used for forming a pattern of a red pixel part of a color filter.

In addition, a color filter may be manufactured by forming a pattern of a pixel part by a method, such as an electrodeposition method, a transfer method, a micelle electrolytic method, or a PVED (photovoltaic electrodeposition) method.

In order to prepare a photosensitive composition for a color filter, for example, a pigment, a photosensitive resin, a photopolymerization initiator, and an organic solvent dissolving the resin are mixed as essential components. The manufacturing method is generally a method by preparing a dispersion of a pigment using an organic solvent and as needed, a dispersant and then adding, for example, a photosensitive resin to the dispersion to prepare a photosensitive composition.

When a green pixel part is obtained, the present inventive compound formed into a pigment and the above-mentioned green pigments and blue pigments can be used as the pigment here. Similarly, when a red pixel part is obtained, the present inventive compound formed into a pigment and the above-mentioned red pigments can be used.

Examples of the dispersant that is used as needed include DISPERBYK (registered trademark) 130, DISPERBYK 161, DISPERBYK 162, DISPERBYK 163, DISPERBYK 170, DISPERBYK LPN-6919, and DISPERBYK LPN-21116 of BYK-Chemie GmbH and Efka 46 and Efka 47 of BASF SE. In addition, for example, a leveling agent, a coupling agent, and a cationic surfactant can be used in combination.

Examples of the organic solvent include aromatic solvents, such as toluene, xylene, and methoxybenzene; acetate-based solvents, such as ethyl acetate, butyl acetate, propylene glycol monomethyl ether acetate, and propylene glycol monoethyl ether acetate; propionate-based solvents, such as ethoxy ethyl propionate; alcoholic solvents, such as methanol and ethanol; ether-based solvents, such as butyl cellosolve, propylene glycol monomethyl ether, diethylene glycol ethyl ether, and diethylene glycol dimethyl ether; ketone-based solvents, such as methyl ethyl ketone, methyl isobutyl ketone, and cyclohexanone; aliphatic hydrocarbon-based solvents, such as hexane; nitrogen compound-based solvents, such as N,N-dimethylformamide, γ-butyrolactam, N-methyl-2-pyrrolidone, aniline, and pyridine; lactone-based solvents, such as γ-butyrolactone; and carbamates, such as a mixture of methyl carbamate and ethyl carbamate at a ratio of 48:52. As the organic solvent, in particular, polar and water-soluble solvents, such as propionate-based, alcoholic, ether-based, ketone-based, nitrogen compound-based, and lactone-based solvents, are suitable.

A dispersion can be obtained by uniformly stirring and dispersing 300 to 1000 parts by mass of an organic solvent and as needed, 100 parts by mass or less of a dispersant and/or 20 parts by mass or less of a quinophthalone derivative with 100 parts by mass of a pigment composition for a color filter of the present invention. Subsequently, 3 to 20 parts by mass of a photosensitive resin for 100 parts by mass of the dispersion, 0.05 to 3 parts by mass of a photopolymerization initiator for 1 part by mass of the photosensitive resin, and as needed, further, an organic solvent are added to the dispersion, followed by uniformly stirring and dispersing to obtain a photosensitive composition for a color filter pixel part.

The pigment composition for a color filter is a mixture of 10 parts by mass of the quinophthalone pigment composition of the present invention with 200 parts by mass or less of a green pigment and/or 200 parts by mass or less of a blue pigment, which is appropriately set up, when used in a green pixel or with 200 parts by mass or less of a red pigment when used in a red pixel. Incidentally, another yellow pigment may be mixed as needed.

Examples of the photosensitive resin that can be used in such a case include thermoplastic resins, such as a urethane-based resin, an acrylic resin, a polyamide acid resin, a polyimide-based resin, a styrene maleic resin, and a styrene maleic anhydride resin; and photopolymerizable monomers, for example, difunctional monomers, such as 1,6-hexanediol diacrylate, ethylene glycol diacrylate, neopentyl glycol diacrylate, triethylene glycol diacrylate, bis(acryloxyethoxy) bisphenol A, and 3-methylpentanediol diacrylate, and multifunctional monomers, such as trimethylolpropane triacrylate, pentaerythritol triacrylate, tris(2-hydroxyethyl) isocyanate, dipentaerythritol hexaacrylate, and dipentaerythritol pentaacrylate.

Examples of the photopolymerization initiator include acetophenone, benzophenone, benzyldimethylketanol, benzoyl peroxide, 2-chlorothioxanthone, 1,3-bis(4'-azidobenzal)-2-propane, 1,3-bis(4'-azidobenzal)-2-propane-2'-sulfonic acid, and 4,4'-diazidostylbene-2,2'-disulfonic acid.

The thus-prepared photosensitive composition for a color filter pixel part can produce a color filter by performing pattern exposure to ultraviolet rays through a photomask and then washing the unexposed portion with an organic solvent, alkaline water, or the like.

EXAMPLES

The present invention will now be described based on examples, but is not limited thereto. Incidentally, "part(s)" and "%" in examples and comparative examples are based on mass unless otherwise specified.

SYNTHETIC EXAMPLES

Synthetic Example 1

Concentrated sulfuric acid (55 g) was placed in a flask, and 6,6'-methylene diquinaldine (7.0 g, 23.5 mmol) obtained by the method described in a literature (Polymer, volume 39, No. 20, (1998), p. 4949) was added thereto with stirring under ice cooling. While maintaining 10° C. or less, 60% nitric acid (6.1 g) was dropwise added thereto, followed by stirring at 10° C. to 20° C. for 1 hour. The reaction solution was poured in 150 mL of ice-water, and the pH was adjusted to 3 with a sodium hydroxide aqueous solution. The precipitated powder was collected by filtration under reduced pressure and was washed with water until neutral. The resulting solid was dried by ventilation at 70° C., and the crude product was then washed and filtered with 100 mL of hot ethyl acetate and then 60 mL of hot toluene to remove impurities, thereby obtaining an intermediate (A) (6.52 g (16.8 mmol), yield: 72%).

$^1$H-NMR (DMSO-d6) δ ppm: 2.70 (s, 6H), 4.42 (s, 2H), 7.58 (d, J=8.8 Hz, 2H), 7.63 (d, J=8.8 Hz, 2H), 8.09 (d, J=8.8 Hz, 2H), 8.13 (d, J=8.8 Hz, 2H)

$^{13}$C-NMR (DMSO-d6) δ ppm: 24.5, 32.0, 117.7, 124.8, 127.5, 129.8, 130.5, 131.9, 145.8, 146.2, 160.7

FT-IR (KBr disk) cm$^{-1}$: 3048, 1602, 1520, 1494, 1363

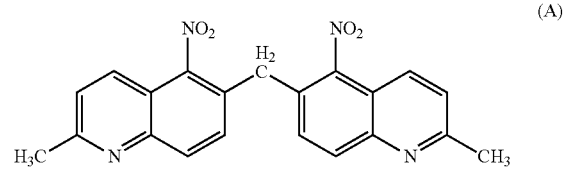

(A)

Synthetic Example 2

Reduced iron (5.30 g) and acetic acid (135 mL) were placed in a flask and were heated to 50° C. with stirring. Subsequently, the compound (A) (4.50 g, 11.6 mmol) obtained in synthetic example 1 was added thereto while maintaining 70° C. or less. After completion of the addition, stirring at 60° C. was continued for 1 hour, and the reaction solution was then cooled to 35° C. or less and was poured in 500 mL of ice-water, and the pH was adjusted to 9 with 20% NaOH water. The generated precipitate was filtered through celite under reduced pressure. The solid was collected, dried by ventilation at 70° C., and added to a solvent mixture of dimethylsulfoxide (DMSO, 100 mL) and N,N-dimethylformamide (DMF, 100 mL), followed by stirring at 90° C. for 1 hour. The mixture was filtered through celite under reduced pressure, and the resulting filtrate was added to 1 L of water with stirring. The generated precipitate was collected by filtration under reduced pressure and was washed with water, thereby obtaining an intermediate (B) (3.80 g (11.6 mmol), yield: 100%).

1H-NMR (DMSO-d6) δ ppm: 2.57 (s, 6H), 3.95 (s, 2H), 5.66 (s, 4H), 7.06 (d, J=8.2 Hz, 2H), 7.16 (d, J=8.2 Hz, 2H), 7.23 (d, J=8.2 Hz, 2H), 8.49 (d, J=8.2 Hz, 2H)

$^{13}$C-NMR (DMSO-d6) δ ppm: 24.6, 32.1, 115.8, 116.2, 119.5, 130.9, 131.8, 141.5, 147.4, 157.0

FT-IR (KBr disk) cm$^{-1}$: 3464, 3363, 3315, 3192, 1640, 1591, 1573, 1415, 1365, 801

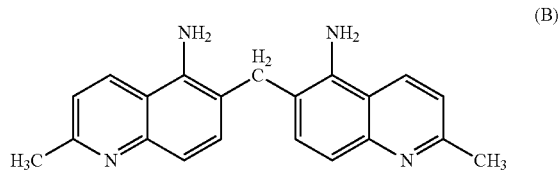

(B)

Synthetic Example 3

In a nitrogen atmosphere, 135 g of benzoic acid was weighed in a flask and was melted at 140° C. The intermediate (B) (3.80 g, 11.6 mmol) obtained in synthetic example 2, tetrachlorophthalic anhydride (17.99 g, 62.9 mmol), and anhydrous zinc chloride (0.49 g, 3.6 mmol) were added to the flask, followed by stirring at 220° C. for 6 hours. The reaction mixture was cooled to 120° C., and chlorobenzene (300 mL) was then added thereto, followed by stirring for 1 hour and filtration under reduced pressure to obtain quinophthalone compound (C) (10.5 g (7.5 mmol), yield: 65%) as a yellow powder.

FT-IR cm$^{-1}$: 1788, 1729, 1688, 1638, 1607, 1537, 1420, 1310, 732

FD-MS: 1400 M+

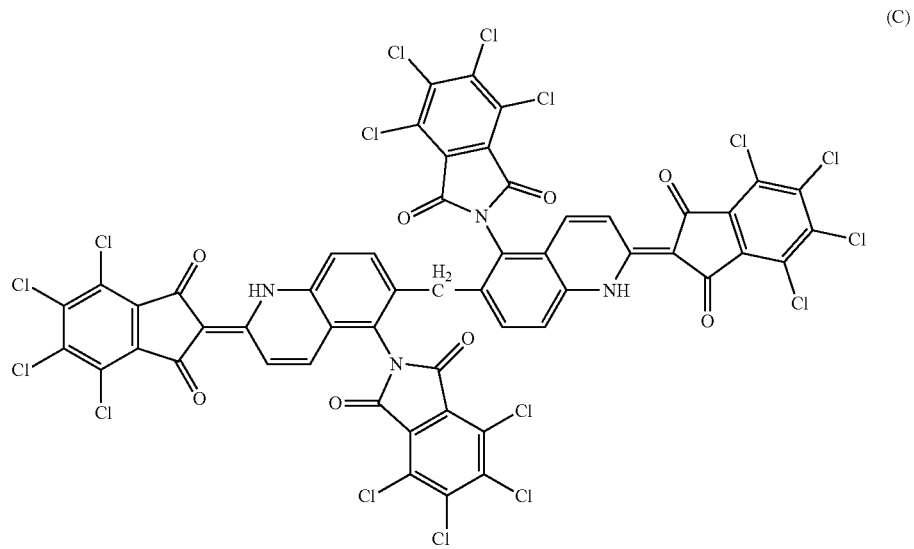 [SMILES: O=C1C(=C2C=Cc3c(ccc(Cc4ccc5c(c4N4C(=O)c6c(Cl)c(Cl)c(Cl)c(Cl)c6C4=O)C=CC(=C4C(=O)c6c(Cl)c(Cl)c(Cl)c(Cl)c6C4=O)N5)c3N3C(=O)c4c(Cl)c(Cl)c(Cl)c(Cl)c4C3=O)N2)C(=O)c2c(Cl)c(Cl)c(Cl)c(Cl)c21]

(C)

Synthetic Example 4

A yellow powder of quinophthalone compound (D) was obtained (yield: 80%) as in synthetic example 3 except that 4,5-dichlorophthalic anhydride was used instead of tetrachlorophthalic anhydride.

FT-IR cm$^{-1}$: 1790, 1728, 1685, 1634, 1582, 1548, 1417, 1343, 1312, 768, 740

FD-MS: 1124 M+

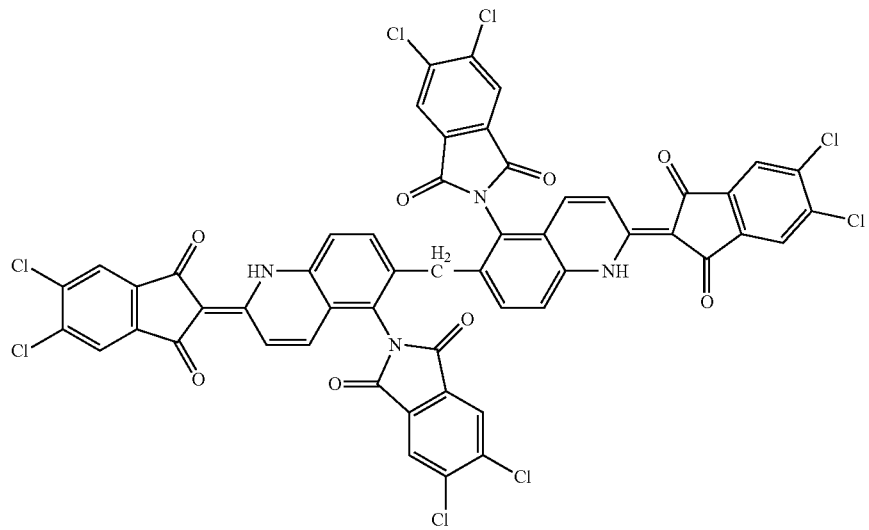

(D)

Synthetic Example 5

A yellow powder of quinophthalone compound (E) was obtained (yield: 85%) as in synthetic example 3 except that tetrabromophthalic anhydride was used instead of tetrachlorophthalic anhydride.

FT-IR cm$^{-1}$: 1730, 1685, 1633, 1604, 1530, 1417, 1335, 1114, 661

FD-MS: 2111 M+

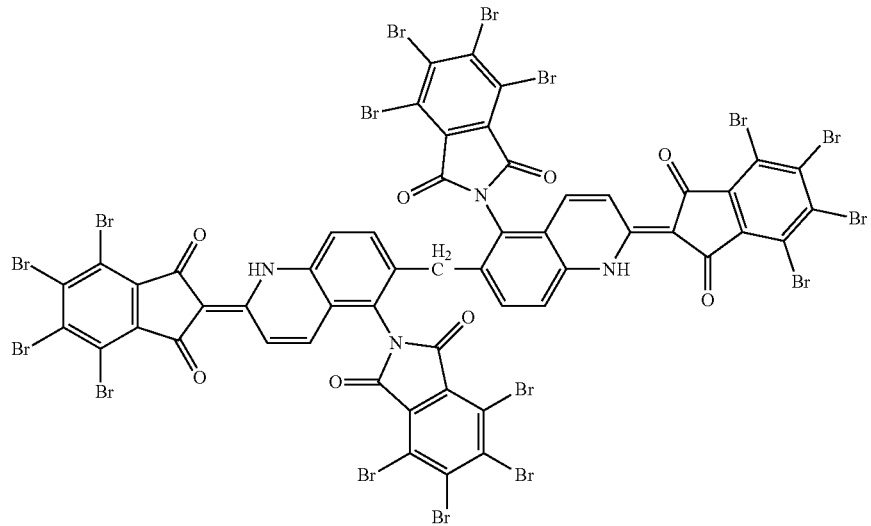

(E)

Synthetic Example 6

A yellow powder of quinophthalone compound (F) was obtained (yield: 70%) as in synthetic example 3 except that tetrafluorophthalic anhydride was used instead of tetrachlorophthalic anhydride.

$^1$H-NMR (DMSO-d6) δ ppm: 4.15 (s, 2H), 7.51 (d, j=8.8 Hz, 2H), 8.21 (d, j=8.8 Hz, 2H), 8.46 (d, j=9.6 Hz, 2H), 8.59 (d, j=9.6 Hz, 2H), 13.80 (s, 2H)

FT-IR cm$^{-1}$: 1734, 1633, 1614, 1494, 1387, 1091, 949

FD-MS: 1136 M+

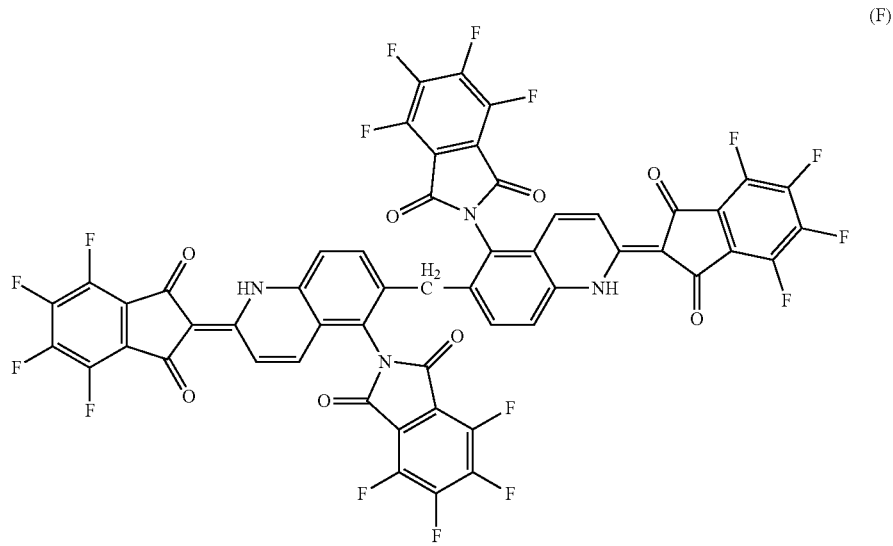 [SMILES: O=C1C(=C2C=Cc3c(ccc(Cc4ccc5c(c4N4C(=O)c6c(F)c(F)c(F)c(F)c6C4=O)C=CC(=C4C(=O)c6c(F)c(F)c(F)c(F)c6C4=O)N5)c3N3C(=O)c4c(F)c(F)c(F)c(F)c4C3=O)N2)C(=O)c2c(F)c(F)c(F)c(F)c21]

(F)

Pigment Formation

A quinophthalone compound (0.500 parts by mass) obtained in the above-described synthetic example was ground together with sodium chloride (1.50 parts by mass) and diethylene glycol (0.750 parts by mass). Subsequently, this mixture was added to 600 parts by mass of warm water, followed by stirring for 1 hour. Water-insoluble content was separated by filtration and was thoroughly washed with warm water and was then dried by ventilation at 90° C. to form a pigment. The particle diameter of the pigment was 100 nm or less, and the average length/width ratio of the particles was less 3.00. The following dispersion test and color filter evaluation test were performed using the resulting yellow pigment of a quinophthalone compound.

Manufacturing Example 1

Quinophthalone compound (C) (0.700 parts by mass) was put in a glass bottle, and propylene glycol monomethyl ether acetate (6.60 parts by mass), DISPERBYK (registered trademark) LPN-21116 (manufactured by BYK-Chemie GmbH, 1.40 parts by mass), and SEPR beads having 0.3 to 0.4 mm diameter (22.0 parts by mass) were added to the bottle, followed by dispersion with a paint conditioner (manufactured by TOYO SEIKI Co., Ltd.) for 2 hours. Propylene glycol monomethyl ether acetate (6.00 parts by mass) was added to the resulting dispersion, further followed by dispersion with the paint conditioner for 0.5 hours to obtain a pigment dispersion. The resulting pigment dispersion (4.00 parts by mass), an acrylic resin solution UNIDIC (registered tradename) ZL-295 (0.60 parts by mass) manufactured by DIC Corporation, and propylene glycol monomethyl ether acetate (0.22 parts by mass) were put in a glass bottle and were shaken to produce a yellow-toning composition.

Manufacturing Example 2

A spin coating liquid was produced as in manufacturing example 1 except that quinophthalone compound (D) obtained in synthetic example 4 was used instead of quinophthalone compound (C).

Manufacturing Example 3

C.I. Pigment Green 59 (manufactured by DIC Corporation, 2.48 parts by mass) was put in a glass bottle, and propylene glycol monomethyl ether acetate (10.9 parts by mass), DISPERBYK (registered tradename) LPN-6919 (manufactured by BYK-Chemie GmbH, 1.24 parts by mass), an acrylic resin solution UNIDIC (registered tradename) ZL-295 (1.86 parts by mass) manufactured by DIC Corporation, and SEPR beads having 0.3 to 0.4 mm diameter were added to the bottle, followed by dispersion with a paint conditioner (manufactured by TOYO SEIKI Co., Ltd.) for 2 hours to obtain a pigment dispersion. Furthermore, the resulting pigment dispersion (4.00 parts by mass), an acrylic resin solution UNIDIC (registered tradename) ZL-295 (0.980 parts by mass) manufactured by DIC Corporation, and propylene glycol monomethyl ether acetate (0.220 parts by mass) were put in a glass bottle and were shaken to produce a green-toning composition.

Example 1

The yellow-toning composition obtained in manufacturing example 1 and the green-toning composition obtained in manufacturing example 3 were mixed with each other, and the mixture was applied onto a glass substrate with a spin coater and was the dried. The resulting glass substrate for evaluation was heated at 230° C. for 1 hour to produce a green color filter showing each green chromaticity in a color standard for high color reproduction when a C light source was used. Incidentally, as the green chromaticity, (0.210, 0.710) used in Japanese Unexamined Patent Application Publication No. 2013-205581 and (0.230, 0.670) used in Japanese Unexamined Patent Application Publication No. 2011-242425 were used.

Example 2

A green color filter was produced as in Example 1 except that the composition obtained in manufacturing example 2 was used instead of the composition obtained in manufacturing example 1 as the yellow-toning composition.

Manufacturing Example 4

C.I. Pigment Yellow 138 (manufactured by BASF SE, 0.70 parts by mass) was put in a glass bottle, and propylene glycol monomethyl ether acetate (6.42 parts by mass), DISPERBYK (registered tradename) LPN-6919 (manufactured by BYK-Chemie GmbH, 0.467 parts by mass), an acrylic resin solution UNIDIC (registered tradename) ZL-295 (0.700 parts by mass) manufactured by DIC Corporation, and SEPR beads having 0.3 to 0.4 mm diameter (22.0 parts by mass) were added to the bottle, followed by dispersion with a paint conditioner (manufactured by TOYO SEIKI Co., Ltd.) for 4 hours to obtain a pigment dispersion. Furthermore, the resulting pigment dispersion (4.00 parts by mass), an acrylic resin solution UNIDIC (registered tradename) ZL-295 (1.00 parts by mass) manufactured by DIC Corporation, and propylene glycol monomethyl ether acetate (0.220 parts by mass) were put in a glass bottle to produce a spin coating liquid.

Comparative Example 1

A green color filter was produced as in Example 1 except that the composition obtained in manufacturing example 4 was used instead of the composition obtained in manufacturing example 1 as the yellow-toning composition.

Manufacturing Example 5

C.I. Pigment Yellow 150 (manufactured by Sanyo Color Works, Ltd., 1.14 parts by mass) was put in a plastic bottle, and propylene glycol monomethyl ether acetate (12.0 parts by mass), DISPERBYK (registered tradename) LPN-21116 manufactured by BYK-Chemie GmbH, 2.84 parts by mass), and SEPR beads having 0.3 to 0.4 mm diameter (38.0 parts by mass) were added thereto, followed by dispersion with a paint conditioner (manufactured by TOYO SEIKI Co., Ltd.) for 4 hours to obtain a pigment dispersion. Furthermore, the resulting pigment dispersion (2.00 parts by mass), an acrylic resin solution UNIDIC (registered tradename) ZL-295 (0.490 parts by mass) manufactured by DIC Corporation, and propylene glycol monomethyl ether acetate (0.110 parts by mass) were put in a glass bottle and were shaken to produce a yellow-toning composition.

Comparative Example 2

A green color filter was produced as in Example 1 except that the composition obtained in manufacturing example 5 was used instead of the composition obtained in manufacturing example 1 as the yellow-toning composition.

Manufacturing Example 6

A yellow-toning composition was produced as in manufacturing example 4 except that quinophthalone compound (6) synthesized by the method described in Japanese Unexamined Patent Application Publication No. 53-228 was used instead of C.I. Pigment Yellow 138 (manufactured by BASF SE).

[Chem. 10]

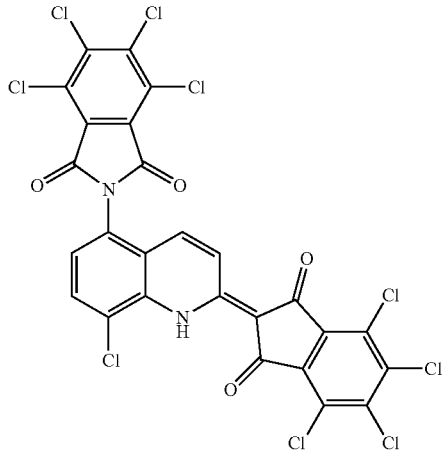

(6)

Comparative Example 3

A green color filter was produced as in Example 1 except that the composition obtained in manufacturing example 6 was used instead of the composition obtained in manufacturing example 1 as the yellow-toning composition.

Color Filter Test Example

Color Filter Characteristic Test

Each of the produced color filters was subjected to measurement of the chromaticity and transmission spectrum with a spectrophotometer (U3900/3900H type, manufactured by Hitachi, Ltd.) and the film thickness (a smaller thickness means higher coloring power) with a film thickness meter (VS1000 scanning white light interference microscope, manufactured by Hitachi, Ltd.). The results are shown in the following Tables 1 and 2.

TABLE 1

| Color filter | (0.210, 0.710)@C. light source | |
|---|---|---|
| | Brightness Y | Film thickness (μm) |
| Example 1 | 25.9 | 3.3 |
| Example 2 | 26.3 | 3.4 |
| Comparative Example 1 | 20.6 | 16.4 |
| Comparative Example 2 | 21.3 | 7.8 |
| Comparative Example 3 | 19.5 | 9.3 |

TABLE 2

| Color filter | (0.230, 0.670)@C. light source | |
|---|---|---|
| | Brightness Y | Film thickness (μm) |
| Example 1 | 38.6 | 1.8 |
| Example 2 | 37.3 | 2.0 |
| Comparative Example 1 | 35.0 | 7.4 |
| Comparative Example 2 | 33.9 | 4.3 |
| Comparative Example 3 | 32.2 | 5.1 |

In Example 1 and Example 2, good brightness was shown and the film thickness was significantly reduced, compared with Comparative Example 2 used the current yellow pigment (C.I. Pigment Yellow 150). This demonstrates that the yellow pigment of the present invention has high brightness and high coloring power in high color reproducibility standard and is suitable as a yellow pigment for a color filter.

In addition, in also a comparative study with Comparative Example 3 (quinophthalone compound (6)), similarly, the brightness was higher and the film thickness was smaller in Example 1 and Example 2, thereby confirming significant improvement in color filter characteristics by dimerization. Quinophthalone compound (6) is the compound described in Japanese Unexamined Patent Application Publication No. 53-228 as Example 2.

Incidentally, in Comparative Example 1 (C.I. Pigment Yellow 138), since the brightness is low and the film thickness is very large, it is not at the practical level. Thus, the present inventive compound has significant effects over a current typical yellow pigment.

The invention claimed is:

1. A quinophthalone compound represented by following formula (1):

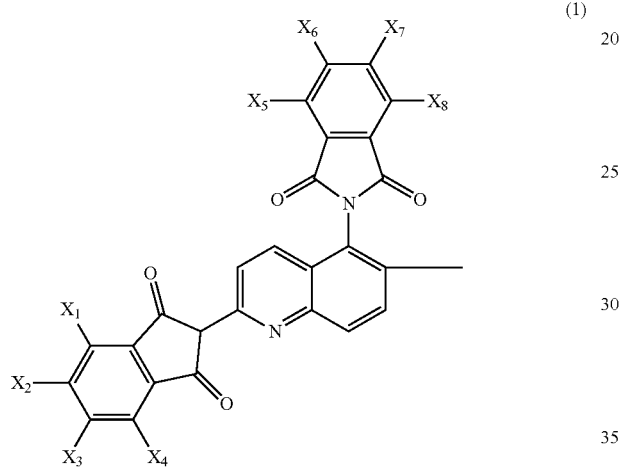

(1)

-continued

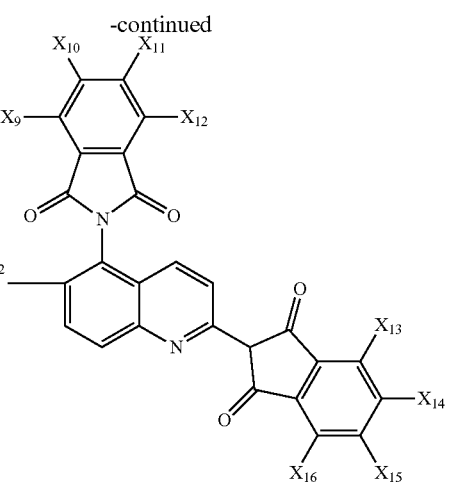

wherein in formula (1), $X_1$ to $X_{16}$ are each independently a hydrogen atom or a halogen atom.

2. A coloring agent containing the quinophthalone compound according to claim 1.

3. A coloring composition for a color filter containing the coloring agent according to claim 2.

* * * * *